United States Patent
Cordery

(10) Patent No.: US 6,704,867 B1
(45) Date of Patent: *Mar. 9, 2004

(54) METHOD FOR PUBLISHING CERTIFICATION INFORMATION REPRESENTATIVE OF SELECTABLE SUBSETS OF RIGHTS AND APPARATUS AND PORTABLE DATA STORAGE MEDIA USED TO PRACTICE SAID METHOD

(75) Inventor: Robert A Cordery, Danbury, CT (US)

(73) Assignee: Bitney Bowes, Inc., Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/280,529

(22) Filed: Mar. 30, 1999

(51) Int. Cl.[7] .............................. H04L 9/08; H04L 9/30; H04L 9/32

(52) U.S. Cl. ........................ 713/165; 705/60; 705/61; 705/40; 705/410; 713/157; 713/171; 380/30; 380/55; 380/282; 380/286

(58) Field of Search ............... 705/40–410; 713/157, 713/171, 165; 380/30, 55, 286, 282

(56) References Cited

U.S. PATENT DOCUMENTS

| 4,796,193 A | * | 1/1989 | Pitchenik ...................... 380/3 |
| 4,853,961 A | | 8/1989 | Pastor |
| 5,214,702 A | * | 5/1993 | Fischer ...................... 380/30 |
| 5,420,927 A | * | 5/1995 | Micali ...................... 380/23 |
| 5,588,061 A | * | 12/1996 | Genesan et al. .............. 380/30 |
| 5,604,804 A | * | 2/1997 | Micali ...................... 380/23 |
| 5,610,982 A | * | 3/1997 | Micali ...................... 380/25 |
| 5,661,803 A | | 8/1997 | Cordery et al. |
| 5,680,456 A | | 10/1997 | Baker et al. |
| 5,737,419 A | | 4/1998 | Ganesan ...................... 380/21 |
| 5,742,682 A | | 4/1998 | Baker et al. |
| 5,805,701 A | | 9/1998 | Ryan, Jr. |
| 5,867,578 A | | 2/1999 | Brickell et al. ............... 380/30 |
| 5,878,136 A | | 3/1999 | Kim et al. |
| 5,982,896 A | | 11/1999 | Cordery et al. |
| 6,041,704 A | | 3/2000 | Pauschinger |
| 6,175,827 B1 | | 1/2001 | Cordery et al. |
| 6,212,281 B1 | * | 4/2001 | Vanstone ...................... 380/282 |
| 6,295,359 B1 | | 9/2001 | Cordery et al. |
| 6,336,188 B2 | * | 1/2002 | Blake-Wilson et al. ....... 713/171 |
| 6,341,349 B1 | * | 1/2002 | Takaragi et al. ............. 713/168 |
| 6,411,716 B1 | * | 6/2002 | Brickell ...................... 380/286 |
| 6,418,422 B1 | * | 7/2002 | Guenther et al. ........... 705/401 |
| 6,424,712 B2 | * | 7/2002 | Vanstone et al. .............. 380/28 |

FOREIGN PATENT DOCUMENTS

EP  0 762 692  12/1997

OTHER PUBLICATIONS

Ravi Gansen, Yaksha: Augmenting Kerberos with publick key Cryptography, Network and distributed System Security, 1995, Symposium, pp. 132–143.*

Menezes et al., Handbook of Applied Cryptography, CRC Press, LLC, 1997, pp. 520–522 and 562–566.*

Kerstetter, Jim; Stamping Out Fraud; Jul. 13, 1998; PC Week v15, n28, p14(1), dialog copy.

EIC NPL seach on postage meter and publick key encryption technology enclosed.

* cited by examiner

Primary Examiner—Frantz B. Jean
Assistant Examiner—Taghi T. Arani
(74) Attorney, Agent, or Firm—Charles R. Malandra, Jr.; Angelo N. Chaclas

(57) ABSTRACT

A method for certification by a plurality of certifying authorities of the public key of a user wishing to communicate using a public key encryption system while asserting only a subset of rights. A plurality of certifying stations and a user station exchange information and the user station derives a plurality of private keys from the exchanged information. The certifying stations also publish related information and their public keys. The user communicates using a private key formed by summing selected ones of said plurality of private keys corresponding to asserted rights. A third party can derive the public key corresponding to the user's summed private key by operating on the published information with a summation of the certifying station public keys.

9 Claims, 7 Drawing Sheets

METHOD FOR PUBLISHING CERTIFICATION INFORMATION REPRESENTATIVE OF SELECTABLE SUBSETS OF RIGHTS AND APPARATUS AND PORTABLE DATA STORAGE MEDIA USED TO PRACTICE SAID METHOD

RELATED APPLICATION

The present application is related to, and discloses subject matter common to commonly assigned, application Ser. No. 09/280,527, filed on even date herewith.

BACKGROUND OF THE INVENTION

The subject invention relates to encryption of information using public key encryption technology. (By "public key" encryption herein is meant encryption technology which uses pairs of keys: a public key, which is published or made publicly known; and a corresponding private key, kept secret by a user.) More particularly it relates to the certification of public keys by a plurality of certifying authorities.

Using public key encryption anyone can encrypt a message with a public key and have assurance that only a user (i.e. a party having the corresponding private key) can decrypt it, and a user can "sign" a message using a private key and anyone can use the corresponding public key to ascertain if the message originated with the user. (A message is "signed" by deriving encrypted information in a known manner from the message.)

Because public keys can be distributed so widely, it will in general be the case that persons communicating with users of public key systems will not be in direct contact with the users and will not be able to directly determine the identity and/or characteristics of the putative users of a public key system. For example a vendor who receives a purchase order signed by the user of a public key which is purportedly that of an authorized agent of the buyer may need to know, but have no way of directly determining, the actual authority of the user. Similarly proof of payment systems, in particular postage meters, which generate indicia encrypted using public key systems as proof of payment have recently been developed by the assignee of the present application and others; and, given the hundreds of thousands of postage meters in service, it is clear that the postal services will face a severe problem in assuring that indicia purportedly generated by a meter corresponding to a particular public key is in fact generated by an authorized postage meter.

To overcome the difficulties inherent in authenticating public keys numerous schemes for issuing certificates for public keys have been proposed. In such schemes, a trusted third party (hereinafter sometimes a "certifying authority") provides parties who wish to communicate with a user with a certificate containing the user's public key, the certificate serving to evidence the third party's assurances as to the identity or characteristics of the user. In the simplest case such certificates are no more than entries in a directory delivered through a secure channel. More generally the certifying authority will use an encryption technology to deliver the certificate.

In U.S. Pat. No. 4,853,961; for: "Reliable Document Authentication System"; to: Pastor, a public key for a postage meter is encrypted with a third party's private key and included in the meter indicia. The postal service uses the third party's public key to recover the meter public key and decrypt the encrypted message which serves to validate the indicia.

In U.S. Pat. No. 5,661,803; for: "Method of Token Verification in a Key Management System"; to: Cordery et al., a method of token verification in a key management system is disclosed.

In U.S. Pat. No. 5,680,456; for: "Method of Manufacturing Generic Meters in a Key Management System"; to: Baker et al., a method for manufacturing transaction evidencing devices such as postage meters includes the steps of generating a master key in a logical security domain of a key management system and installing the master key in a postage meter.

In U.S. Pat. No. 5,742,682; for: "Method of Manufacturing Secure Boxes in a Key Management System"; to: Baker et al., a method of manufacturing a secure box in a key management system is taught.

In U.S. Pat. No. 5,805,701; for: "Enhanced Encryption Control System for a Mail Processing System Having Data Center Verification"; to: Ryan, Jr., a key control system comprising generation of a first set of master keys and assigning the keys to a corresponding plurality of postage meters is taught.

In U.S. application Ser. No. 08/133,416; by: Kim et al.; filed Oct. 8, 1993, a key control system comprising generation of a first set of master keys and assigning the keys to a corresponding plurality of postage meters is taught. Keys may be changed by entry of a second key via encryption with a first key.

In U.S. application Ser. No. 08/772,739; by: Cordery; filed Dec. 23, 1996, a method for controlling keys used in the verification of encoded information generated by a transaction evidencing device and printed on a document is taught.

While the above methods are successful in achieving their intended purpose they are disadvantageous in that they are computationally complex, may produce certificates which are large and inflexible, and may require special hardware.

The following references contain information useful to a general understanding of elliptic curve encryption and certification of public keys.

Secure Hash Standard—FIPS PUB 180-1," Apr. 17, 1995.

Digital Signature Standard—FIPS PUB 186," May 19, 1994 and Change 1, Dec. 30, 1996.

ANSI X9.62, Elliptic Curve Digital Signature Algorithm Standard (ECDSA), Working Draft, Jan. 15, 1997.

ISO/IEC 9594-8 (1995). Information Technology—Open Systems Interconnection—The Directory: Authentication Framework."

PKCS #10: Certification Request Syntax Standard, An RSA Laboratories Technical Note," Version 1.0, December 1993.

Another method of key certification based upon elliptic curve public key encryption technology has been developed by the Certicom Corporation. (The use of elliptic curve encryption technology is known and a more detailed description of its use, beyond what is given below in the context of certification of public keys, is not required for an understanding of the subject invention.)

Elliptic curve encryption is an example of a cryptographic algorithm based on application of an binary additive operator to points in a finite group. In elliptic curve encryption a finite group of points [P] of order n is defined on an elliptic curve. A binary additive operator [+] (hereinafter sometimes "point addition") is defined on the group [P] such that P[+]P' is a point in [P]. A more detailed, graphical description of point addition is shown in FIG. 1. As is known to those skilled in the cryptographic art, disjoint curve 10 has the general form $y^2=x^3+ax+b$ defined over the finite Galois field $GF(p^m)$ where p is a prime number other than 2 and m is an integer. Over the Galois field $GF(2^m)$ the curve has the form $y^2+xy=x^3+ax+b$. It can be shown that groups of discrete points [P] of order n can be defined on curve 10, where n is preferably a number on the order of at least 50 decimal digits in order to provide sufficient security for encrypted information.

As is seen in FIG. 1 curve 10 is symmetric about the x axis so that for any point (x,y) on curve 10 its reflection around the x axis R(x,y)=(x,−y) is also on curve 10.

For two points P,P' in [P] it can be show that there exists a unique point R(P[+]P') which is a third point common to straight line 12 defined by P and P' and curve 10. P[+]P' is defined as R(R(P[+]P')).

FIG. 2 shows the special case for computation of P[+]P. Straight line 14 is defined as tangent to the closed portion of curve 10 and intersecting point P, and R(P[+]P) is defined as the second point common to line 14 and curve 10.

A second operation K*P (herein after sometimes "point multiplication") is defined as the application of [+] to K copies of a point P. FIG. 3 geometrically illustrates computation of 5*P by successive computation of the points P[+]P=2*P, 2*P[+]2*P=4*P, 4*P[+]P=5*P. Point multiplication is the basic operation underlying elliptic curve encryption and has the property that computation of K from knowledge of the group [P], a particular point P, and K*P is hard.

By "hard" as used herein in regard to computation is meant a computation wherein the time required increases faster than the order of the operands (log n), and preferably exponentially or faster with log n. This means that where K is of order n, the order of [P], and n is chosen large enough the cost, in time or money, of computing K from knowledge of the definition of [P], P, and K*P can be made arbitrarily large while the cost of other computations relating to encryption or decryption remains relatively low and practicable. Of course those skilled in the encryption art will recognize that, even though encryption and decryption can in principle be carried out by manual computation, the possibly of an attack on an encryption scheme using modern computer technology requires that, in practice, the order n be so great that even the relatively easy computations must be carried out by automated encryption stations; e.g. special purpose, or specially programmed general purpose, digital processing systems.

Point multiplication has been described in terms of the group represented by point addition on a discrete elliptic curve. In other embodiments the subject invention can be implemented using any group representation where determining K is hard given the point P and the point formed by combining K copies of point P by repeated application of the group additive point operation. Accordingly, unless otherwise stated the terms "point P" and "group [P]" as used herein are intended to include any elements, e.g. integers, functions, permutations, etc., as well as spatial points, for which a binary operation and corresponding group having the necessary properties as described above can be defined.

In elliptic curve encryption a user U has a private key $Key_U$ and a corresponding public key $Key_U*P$; where P is a published or publicly known point in [P]. To generate a certified public key in accordance with the above mentioned Certicom encryption scheme user U (i.e. a station operated by user U) generates and keeps secret a random number $r_U$; and computes and sends to a certifying authority CA the point $r_U*P$. Certifying authority CA has a private $Key_{CA}$ and a public key $Key_{CA}*P$. Upon receipt of $r_U*P$ the CA generates a random number $r_{CA}$ and computes and publishes a certificate including a point, $r_U*P[+]r_{CA}*P$, wherein $r_{CA}$ is a random number generated by the CA (i.e. by the CA station). Authority CA, which is presumed to have the capability to directly determine the identity or characteristics of user U, also generates information $ID_U$ about U and includes $ID_U$ in the certificate. Certifying Authority CA then returns an integer derived from the CA's private key and the certificate to the user station which uses that integer to compute key $Key_U$ in such a manner that a party communicating with user U can compute $Key_U*P$ from the certificate and the certifying authority's public key $Key_{CA}$; providing evidence that the certifying authority has linked user U, $Key_U$, and $ID_U$. The user does not know $r_{CA}$ and the CA does not know $r_U$. With this procedure, only the user knows $Key_U$ and only the CA could link $ID_U$ to the CA public key.

The above described certification scheme is believed to be advantageous in that it is computationally simpler, and produces smaller certificates. However it does not address the situation where a user may act in one of a plurality of capacities or wish to clearly evidence that he or she is asserting only a selected subset of the rights and parties communicating with the user may need assurance that the user possess at least the rights or authority asserted. For example, during negotiations a party may wish to sign messages as evidence of his or her identity, and only when making or accepting an offer may wish to sign a message so as to evidence authority to act as agent for one or more principles. Such a capability would be particularly useful where some of a group of principles elect to opt out of a deal at the last moment. The agent could then make or accept a binding offer; signing it in a manner which would evidence that the agent acted only on behalf of those principles who elected to accept the deal.

BRIEF SUMMARY OF THE INVENTION

The above object is achieved and the disadvantages of the prior art are overcome in accordance with the subject invention by a method and apparatus which provide the user with a collection of certified rights, each with its own certificate. The certificate for each right has its own validity conditions such as validity period and revocation status and each right can be certified by a separate authority. The user constructs a private key associated with any subset of his collection of certified rights, and thereby can sign a message with a private key which evidences only the rights asserted for the message.

In accordance with one aspect of the invention information is distributed among, a plurality of stations, one of the stations being a user station operated by a user U to generate a plurality of private encryption keys $Key_{U,i}$ and others of the stations being certifying stations operated by a plurality of certifying authorities for publishing related information, the related information identifying particular rights certified to the user U, so that a corresponding public key $Key_{U,sum(i)}*P$ of user U can be determined by a party communicating with user U from the published related information with assurance that at least rights asserted by user U have been certified by corresponding ones of the certifying authorities CA, but the party cannot claim that other rights were asserted. The method of distribution includes: a) defining a finite group [P] with a binary operation [+] and publishing a particular point P in the group; b) defining and publishing a binary operation K*p, where K is an integer and p is a point in the group, such that K*p is a point in the group computed by applying the operation[+] to K copies of point p, and computation of K from knowledge of the definition of group [P], point p, and K*p is hard; c) controlling each of the certifying stations to publish a certificate $CERT_{U,i}$ for said user U, wherein;

$$CERT_{U,i} = (r_{U,i} + r_{CAi})*P;\text{ and wherein}$$

$r_{U,i}$ is a random integer known only to said user U and $r_{CAi}$ is a random integer generated by an ith one of said certifying stations; d) controlling each of the certifying stations to publish a message $M_i$, message $M_i$ identifying particular rights certified to user U by an ith one of the certifying stations; e) controlling each of the certifying stations to generate an integer $I_i$, and send $I_i$ to the user station, wherein;

$$I_i = r_{CAi} + H(M_i)\text{Key}_{CAi};\text{ and wherein}$$

$H(M_i)$ is an integer derived from the message $M_i$ in accordance with a publicly known algorithm H, and $r_{CAi}$ is one of the random integers generated by, and $\text{Key}_{CAi}$ is a private key of, an ith one of the certifying stations; f) publishing a public key $\text{Key}_{CAi}*P$ for each of the certifying authorities CA; and g) controlling said user station to compute a plurality of private keys $\text{Key}_{U,i}$, wherein $$\text{Key}_{U,i} = r_{U,i} + I_i = r_{U,i} + r_{CAi} + H(M_i)\text{Key}_{CAi}$$

whereby h) user U can generate a private key $\text{Key}_{U,sum(i)}$ to communicate while asserting only a selected subset of rights $$\text{Key}_{U,sum(i)} = \text{sum}(\text{Key}_{U,i}) = \text{sum}(r_{U,i} + r_{CAi} + H(M_i)\text{Key}_{CAi})$$

summed over asserted rights; and i) the communicating party can compute said user's public key $\text{Key}_{U,sum(i)}*P$ as $$\text{Key}_{U,sum(i)}*P = \text{sum}_{[+]}(CERT_{U,i}[+]H(M_i)\text{Key}_{CAi}*P) = \text{sum}_{[+]}((r_{U,i} + r_{CAi})*P + H(M_i)\text{Key}_{CAi}*P) = \text{sum}(r_{U,i} + r_{CAi} + H(M_i)\text{Key}_{CAi})*P$$

from knowledge of H, messages $M_i$, [P], said public keys $\text{Key}_{CAi}*P$, and certificates $CERT_{U,i}$.

In accordance with another aspect of the invention the publicly known manner for deriving an integer from the published information comprises applying a hashing function to the messages $M_i$.

In accordance with another aspect of the invention at least one of the messages $M_i$ includes information identifying or characterizing user U.

In accordance with another aspect of the invention at least one of the messages $M_i$ includes information identifying or characterizing user U.

In accordance with another aspect of the invention at least one of the particular rights is certified to user U by a plurality of certifying authorities operating a corresponding plurality of certifying stations.

In accordance with another aspect of the invention the group [P] is defined on an elliptic curve.

In accordance with another aspect of the invention messages $M_i$ include information tying user U's public key $\text{Key}_{U,i}*P$ to information $IDR_{U,i}$ which identifies particular rights which can be certified by an ith one of the certifying authorities CA.

In accordance with still another aspect of the invention data processing apparatus includes a programmable processor programmed to control said apparatus as a user station used by user U to generate a plurality of private encryption keys $\text{Key}_{U,i}$, said user station communicating with a plurality of certifying stations, each of the certifying stations being controlled to publish related information, the related information identifying particular rights certified to user U, so that a corresponding public key $\text{Key}_{U,sum(i)}*P$ of said user U can be determined by a party communicating with said user U from the published related information with assurance that at least rights asserted by user U have been certified by corresponding ones of the certifying authorities CA, but cannot claim that other rights were asserted, the related information including certificates $CERT_{U,i}$ for user U, wherein $CERT_{U,i}$ is $(r_{U,i} + r_{CAi})*P$, wherein P is a published point in a group [P], and wherein $r_{U,i}$ is a random integer known only to user U and $r_{CAi}$ is a random integer generated by an ith one of the certifying stations; the processor controlling the apparatus to: a) transmit a point $r_{U,i}*P$ in said group [P] to at least an ith one of said certifying stations to request particular rights certified by said ith certifying station; b) receive at least one encrypted integer $I_i$ from the ith certifying station, wherein;

$$I_i = r_{Cai} + H(M_i)\text{Key}_{CAi};\text{ and wherein}$$

$H(M_i)$ is an integer derived from said message $M_i$ in accordance with a publicly known algorithm H, and $r_{CAi}$ is a random integer generated by, and $\text{Key}_{CAi}$ is a private key of the ith certifying station; c) generate at least one private key $\text{Key}_{U,i}$ as:

$$\text{Key}_{U,i} = r_{U,i} + I_i = r_{U,i} + r_{CAi} + H(M_i)\text{Key}_{CAi};$$

whereby d) the user can generate a private key $\text{Key}_{U,sum(i)}$ to communicate while asserting only a selected subset of rights $$\text{Key}_{U,sum(i)} = \text{sum}(\text{Key}_{U,i}) = \text{sum}(r_{U,i} + r_{CAi} + H(M_i)\text{Key}_{CAi})$$

summed over asserted rights; and e) the communicating party can compute the user's public key $\text{Key}_{U,sum(i)}*P$ as $$\text{Key}_{U,sum(i)}*P = \text{sum}_{[+]}(CERT_{U,i}[+]H(M_i)\text{Key}_{CAi}*P) = \text{sum}_{[+]}((r_{U,i} + r_{CAi})*P + H(M_i)\text{Key}_{CAi}*P) = \text{sum}(r_{U,i} + r_{U,i} + H(M_i)\text{Key}_{CAi})*P$$

from knowledge of H, messages $M_i$, [P], public keys $\text{Key}_{CAi}*P$, and certificates $CERT_{U,i}$.

In accordance with still another aspect of the invention portable data storage media store signals representative of program code the code readable by a data processing apparatus to control the apparatus to operate as a user station used by a user U to generate a plurality of private encryption keys $\text{Key}_{U,i}$, the user station communicating with a plurality of certifying stations, each of the certifying stations being controlled to publish related information, the related information identifying particular rights certified to the user U, so that a corresponding public key $\text{Key}_{sum(i)}*P$ of user U can be determined by a party communicating with user U from the published related information with assurance that at least rights asserted by user U have been certified by a corresponding one of the certifying authorities CA, but cannot claim that other rights were asserted, the related information including a certificates $CERT_{U,i}$ for said user U, wherein $CERT_{U,i}$ is $(r_{U,i} + r_{CAi})*P$, wherein P is a published point in a group [P], and wherein $r_{U,i}$ is a random integer known only to said user U and $r_{Cai}$ is a random integer generated by an ith one of the certifying stations.

In accordance with still another aspect of the invention a method for certification of a public key of a user by a plurality of certifying authorities, each of said certifying authorities having a published public key and a corresponding private key, includes the steps of: a) each of the certifying authorities providing the user with an integer, each of the integers being a first function of one of the private keys for a corresponding one of said authorities; b) the user computing a plurality of private keys, each of the private keys being a second function of one of the integers; c) each of the certifying authorities publishing related information, the related information identifying a particular right certified to the user by a corresponding one of the authorities; and d) the user computing a summed private key corresponding to a subset of asserted rights by arithmetic summation of selected ones of the plurality of private keys; wherein e) the first function, the second function and the published related information are chosen so that a party communicating with the user can compute a user public key, corresponding to said summed private key, by operating on the published related information with a point summation of said published public keys of the authorities.

In accordance with still yet another aspect of the invention a party communicating with user U can determine a public key $Key_{U,sum(i)}*P$ of a user's encryption station with assurance that at least rights asserted by said user U have been certified by corresponding ones of a plurality of certifying authorities CA, but cannot claim that other rights were asserted. The method includes the steps of: a) obtaining a certificates $CERT_{U,i}$ corresponding to the rights asserted by the user U, wherein;

$$CERT_{U,i} = (r_{U,i} + sum(r_{CAi}))*P; \text{ and wherein}$$

$r_{U,i}$ is a random integer known only to user U and $sum(r_{CAi})$ is a sum of a plurality of random integers $r_{CAi}$, summed over certifying stations corresponding to said rights asserted by user U, an ith one of the certifying stations generating an ith one of the random integers $r_{CAi}$; b) obtaining messages $M_i$, each of the messages $M_i$ being published by a one of the certifying stations corresponding to the rights asserted by user U; c) computing a hash $H(M_i)$ of each of the messages $M_i$ in accordance with a predetermined hashing function H; d) obtaining a plurality of public keys $Key_{CAi}*P$ for the plurality of corresponding certifying authorities CA, an ith one of said authorities having an ith one of said keys $Key_{CAi}$; and e) computing user U's public key $Key_{U,sum(i)}*P$, summed over asserted rights, as $$Key_{U,sum(i)}*P = sum_{[+]}(CERT_{U,i}[+]H(M_i)Key_{CAi}*P) = sum_{[+]}((r_{U,i} + r_{CAi})*P[+]H(M_i)Key_{CAi}*P) = sum(r_{U,i} + r_{CAi} + H(M_i)Key_{CAi})*P;$$

wherein f) a binary operation [+] is defined on a finite group [P] having a published particular point P; and g) K*p, is a second binary operation defined on the group [P], where K is an integer and p is a point in the group, such that K*p, is a point in the group computed by applying the operation [+] to K copies of point p, and computation of K from knowledge of the definition of said group [P], the point p, and K*p is hard.

DETAILED DESCRIPTION OF THE PREFERRED EMBODIMENTS OF THE INVENTION

Figure 1:
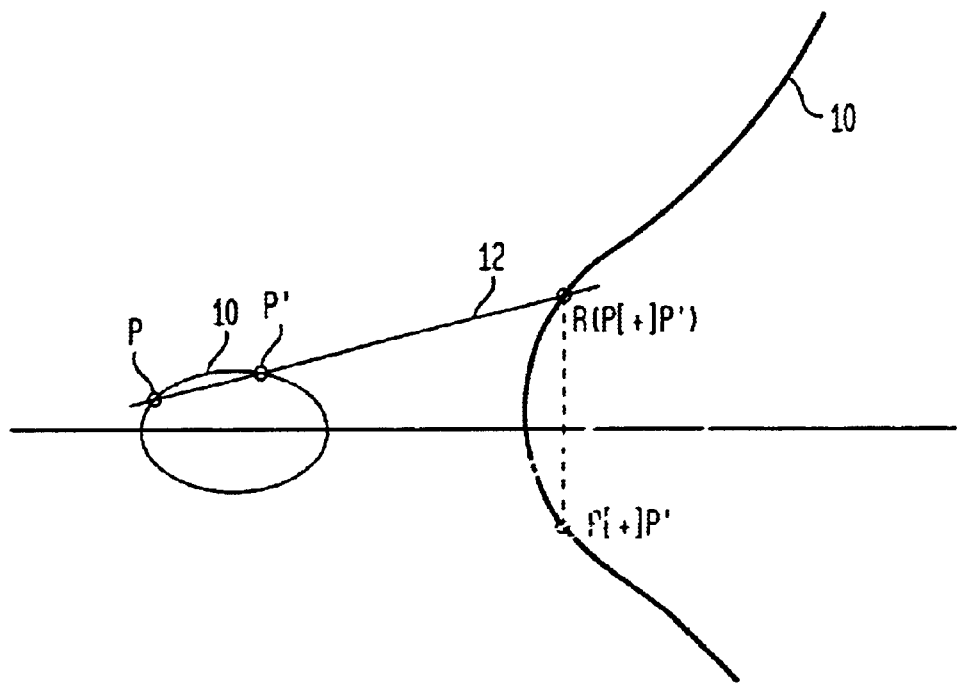
FIG. 1 is a graph illustrating the prior art operation of point addition of points P and P'.
Figure 2:
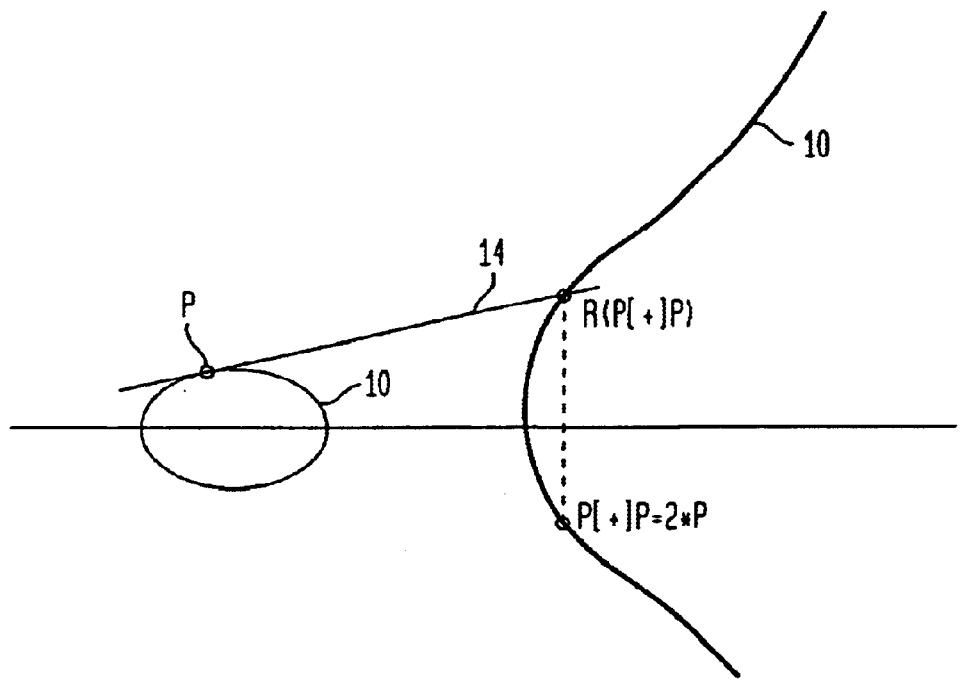
FIG. 2 is a graph illustrating the prior art operation of point addition of two copies of point P.
Figure 3:
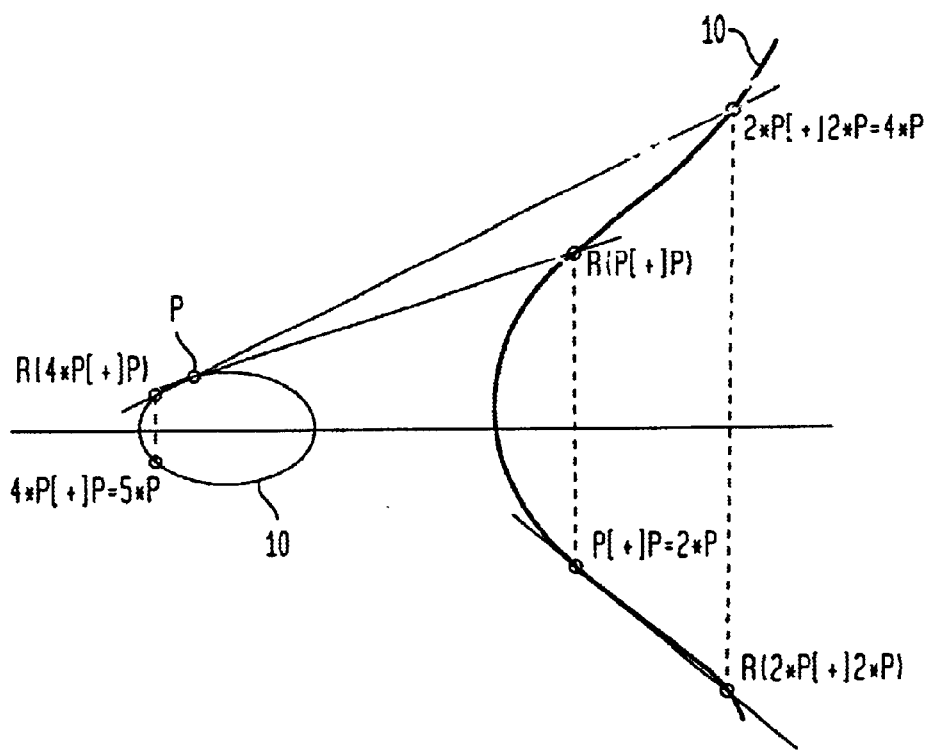
FIG. 3 is a graph illustrating the prior art operation of point multiplication of point P.
Figure 4:
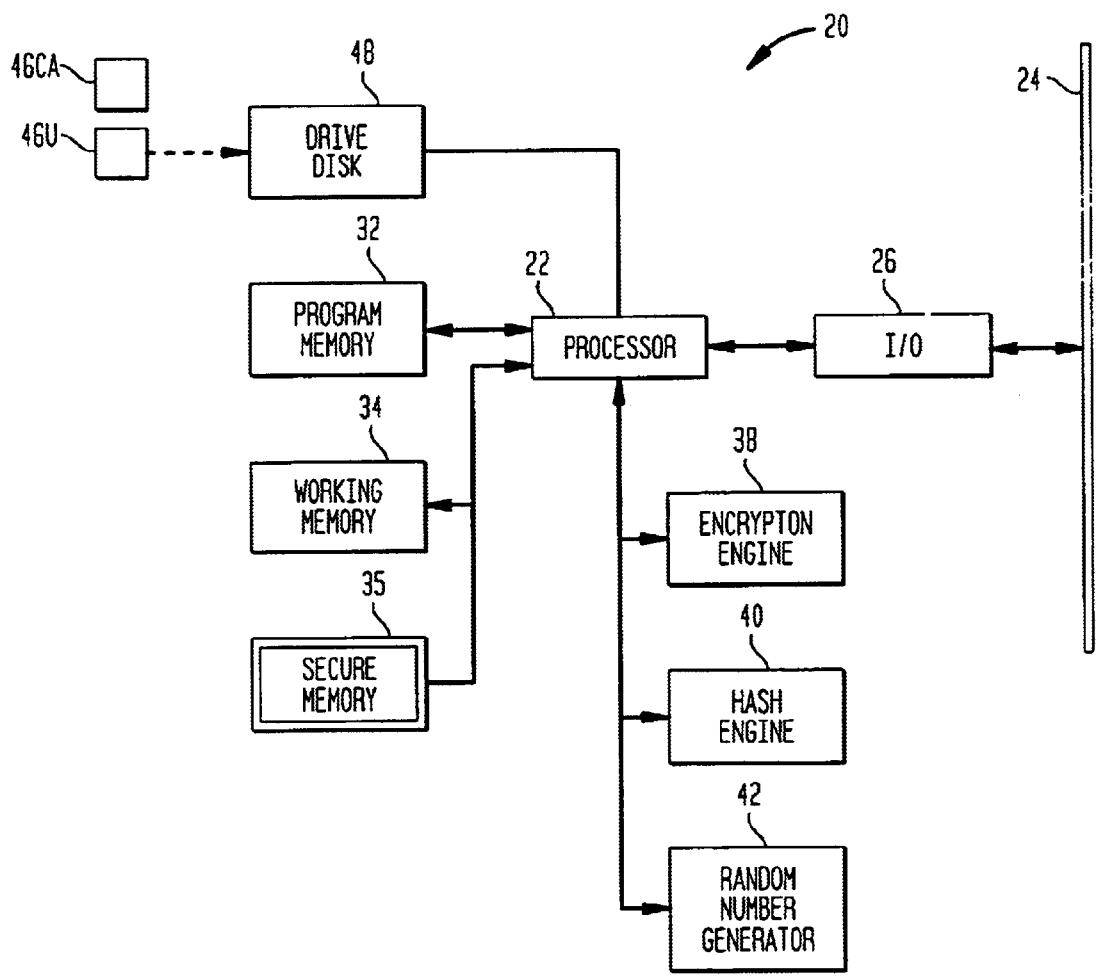
FIG. 4 is a schematic block diagram of a general encryption station which can be programmed to serve users or various certifying authorities.

FIG. 4 shows a general encryption station 20 which can be adapted to perform the functions required by a user or any of various certifying authorities. Station 20 includes processor 22 connected to data link 24 through I/O device 26. Data link 24 may be of any convenient kind, including but not limited to computer communication networks, telephone networks and dedicated lines, or can simply be the exchange of portable data storage media such as magnetic disks, with I/O device 26 being designed in a conventional manner to interface to link 24.

Processor 22 also communicates with program memory 32 to access program code to control station 20 to carry out functions of a user or one of various certifying authorities, and working memory 34 for temporary storage of data.

To increase security, station 20 also includes secure memory 35 for storing certain critical parameters, as will be described further below. Preferably memory 35 is secured against unauthorized access by conventional means known to those skilled in the art, which can include physical security such as be shielding and software based techniques such as passwords and encryption.

Processor 22 also communicates with, and controls as necessary: encryption engine 38 for carrying out point additions and point multiplication's; hash engine 40 for performing a publicly known hash function, preferably the SHA-1 hash function promulgated by the National Security Agency; and random number generator 42 for generating random numbers. While the above described engines have been shown as dedicated devices for clarity of illustration, in other embodiments the encryption, hashing, and random number generation functions can be carried out by software routines stored in program memory 32.

Station 20 is preferably adapted to carry out the functions of a user or one of various certifying authorities by reading signals representative of an appropriate control program code recorded on portable media such as magnetic disks 46U or 46CA into program memory through disk drive 48 (Details of the operations of various certifying authorities and users in carrying out the method of the subject invention are described more fully below and development of control programs to control stations to function in such roles would be well within the ability of a person skilled in the cryptographic art.).

Figure 5:
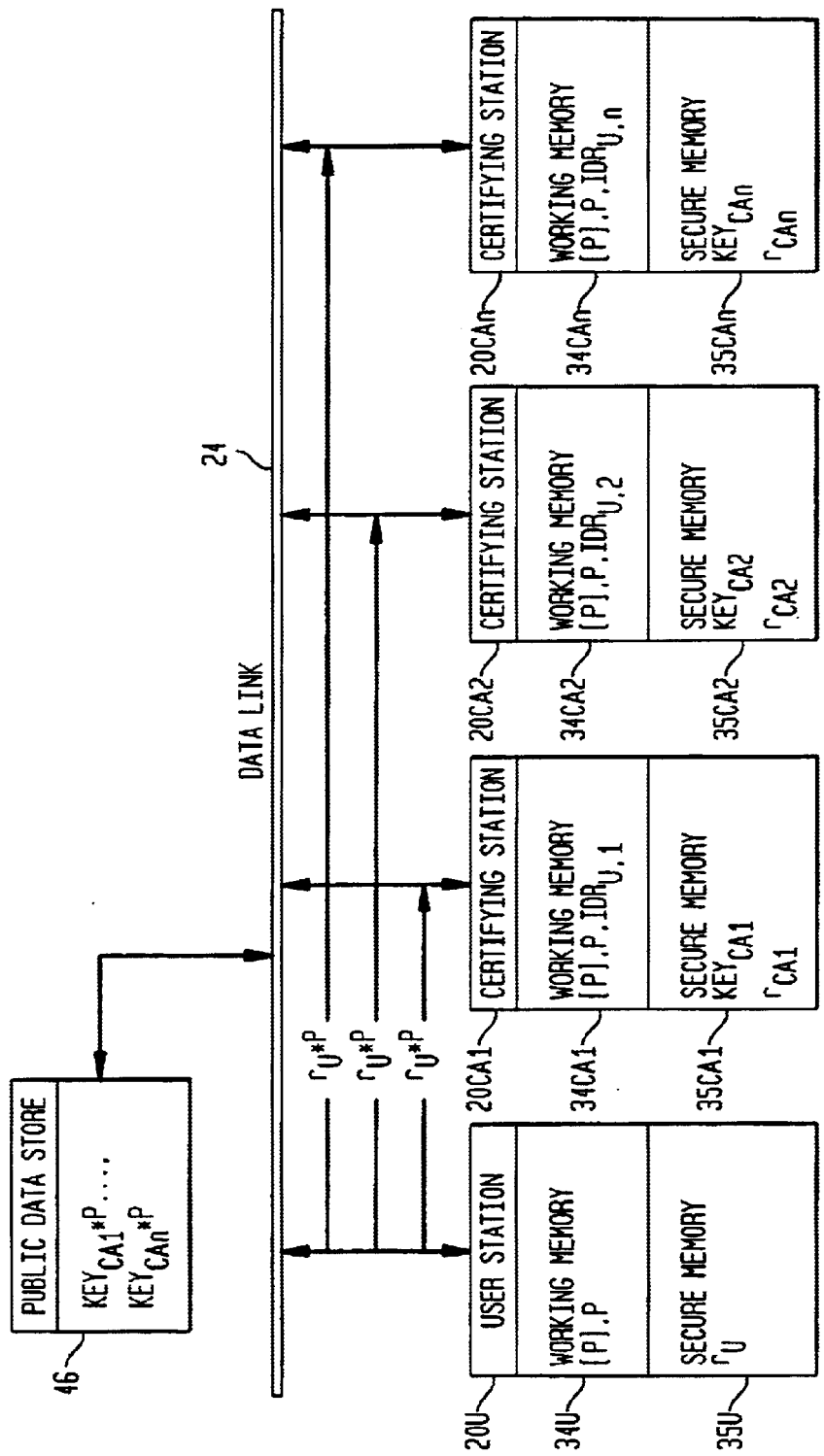
FIGS. 5–8 show a network of various encryption stations communicating over a data link in accordance with the method of the subject invention.
Figure 6:
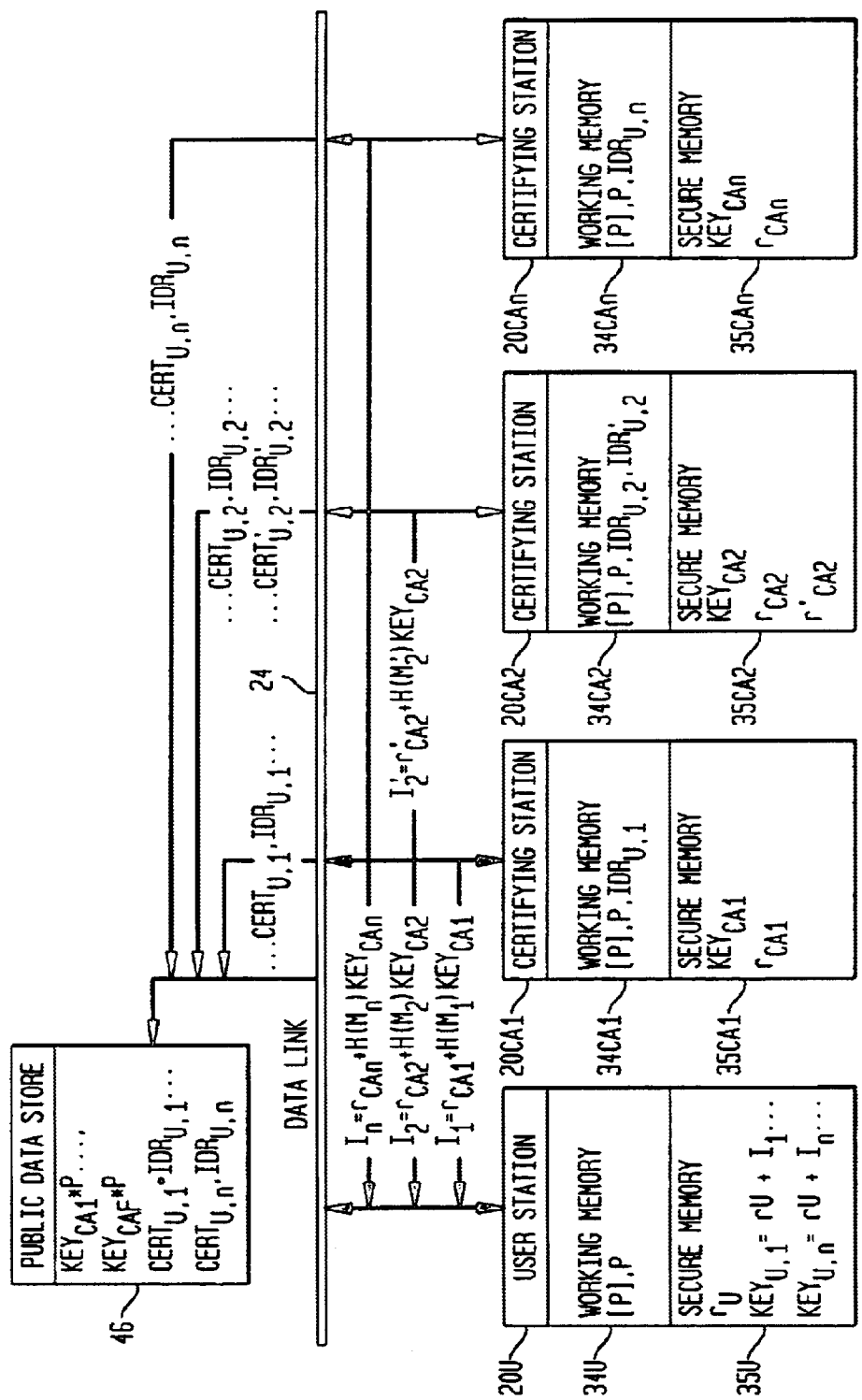

FIGS. 5 and 6 show a network of stations having substantially the architecture shown in FIG. 4 which communicate over data link 24 to carry out the method of the subject invention. Public data store 46 is also connected to link 24 to store data accessible to any party communicating over link 24.

Initially user station 20U, operated by user U, stores a description of a group [P] (i.e. information needed to carry out additive operation [+]) and a particular, publicly known point P in its working memory 34U; certifying stations 20CA1–20CAn operated by a corresponding certifying authorities store [P], P, and information $IDR_{U,1}$–$IDR_{U,n}$ which identify particular rights which corresponding certifying authorities can certify to user U in working memories 34CA1–34CAn and corresponding keys $Key_{CA1}$–$Key_{CAn}$ in secure memories 35CA1–35CAn; and public data store 46 stores public keys $Key_{CA1}*P$–$Key_{CAn}*P$. Rights can be limited in any desired manner such as time, territory, subject matter, or dollar amount, by information $IDR_{U,i}$. Preferably information $IDR_{U,i}$ will also identify or characterize user U.

User station 20U initiates the certification process by generating and storing a random number $r_U$ in secure memory 35U, computing points $r_{U,i}*P$, and sending points $r_{U,i}*P$ to corresponding ones of stations 20CA1–20CAn. A selected station 20CAi (assuming the station determines to certify the right to user U) then generates and store a random number $r_{CAi}$ in secure memory 35CAi and computes the point:

$$CERT_{U,i} = r_{U,i}*P[+]r_{CAi}*P = (r_{U,i} + r_{CAi})*P$$

(In the case where a certifying station cannot certify user U the station can enter an error routine to abort the certification process. Details of such an error routine form no part of the subject invention.)

[Alternatively, user U may employ the same random integer $r_U$ for each certificate authority and send $r_U*P$ to each CAi.]

Turning to FIG. 6 station 20CAi then generates and publishes message $M_i$:

$$M_i = CERT_{U,i}, IDR_{U,i}$$

by sending $M_i$ to public data store 46. Each certifying station 20CAi then computes a hash $H(M_i)$ of message $M_i$ where H is a publicly known hashing function and is preferably the known SHA-1 function and then generates an integer $I_i$:

$$I_i = r_{CAi} + H(M_i) Key_{CAi}$$

and sends integer $I_i$ to station 20U. In another embodiment, $IDR_{U,i}$ may be sent by user U with a signed message to a recipient, and certifying station 20CAi publishes $CERT_{U,i}$.

Station 20U then computes a plurality of private keys $Key_{U,i}$ each corresponding to a particular right which has been certified to user U:

$$Key_{U,i} = r_{U,i} + I_i = r_{U,i} + r_{CAi} + H(M) Key_{CAi}$$

(In computing integers $I_i$ The expression of point $CERT_{U,i}$ is handled as an integer.)

To communicate while asserting only a selected subset of rights user U generates a private key $Key_{U,sum(i)}$ $$Key_{U,sum(i)} = sum(Key_{U,i}) = sum(r_{U,i} + r_{CAi} + H(M_i) Key_{CAi})$$

summed over asserted rights

A party communicating with user U can then compute user U's public key $Key_{U,sum(i)}*P$ as:

$$Key_{U,sum(i)}*P = sum_{[+]}(CERT_{U,i} + H(M_i)*(Key_{CAi}*P)) = sum_{[+]}((r_{U,i} + r_{CAi})*P + H(M_i) Key_{CAi}*P) = sum(r_{U,i} + r_{CAi} + H(M_i) Key_{CAi})*P$$

from knowledge of H, messages $M_i$, said public keys $Key_{CAi}*P$, and certificates $CERT_{U,i}$; (wherein "sum (_)" represents summation by arithmetic addition and "$sum_{[+]}$(_)", summation by point addition). Since the computation of public key $Key_U*P$ requires the point summation of public keys $Key_{CA1}*P - Key_{CAn}*P$ the communicating party has assurance that at least the rights asserted have been certified to user U by each corresponding certifying authority; but cannot claim that user U has acted with any other rights not used to generate $Key_{U,sum(i)}$.

A certifying authority can certify more than a single particular right. For example, a principle may wish to temporarily broaden the authority of an agent. In FIG. 6 station 20CA2 certifies a second right $IDR'_{U,2}$ by generating and storing a second random number $r'_{CA2}$, and generating $CERT'_{U,i}$, $M'_i$, and $I'_i$ in the same manner as described above. The rights so certified can than be treated as any others.

Inspection of the above formulas for $Key_{U,sum(i)}$ and $Key_{U,sum(i)}*P$ shows them to be consistent for arbitrary values of $H(M_i)$. The values specified in the preferred embodiment described above, $H(CERT_{U,i}, IDR_{U,i})$, are preferred since incorporation of $CERT_{U,i}$ into message $M_i$ securely ties information $IDR_{U,i}$ to $Key_{U,i}*P$ and hashing of message $M_i$ is useful to prevent forgery of messages which will yield $Key_{U,i}*P$ but which contain different information $IDR_{U,i}$. However if communications of certificates are secure any value derived in a publicly known manner may be used.

Figure 7:
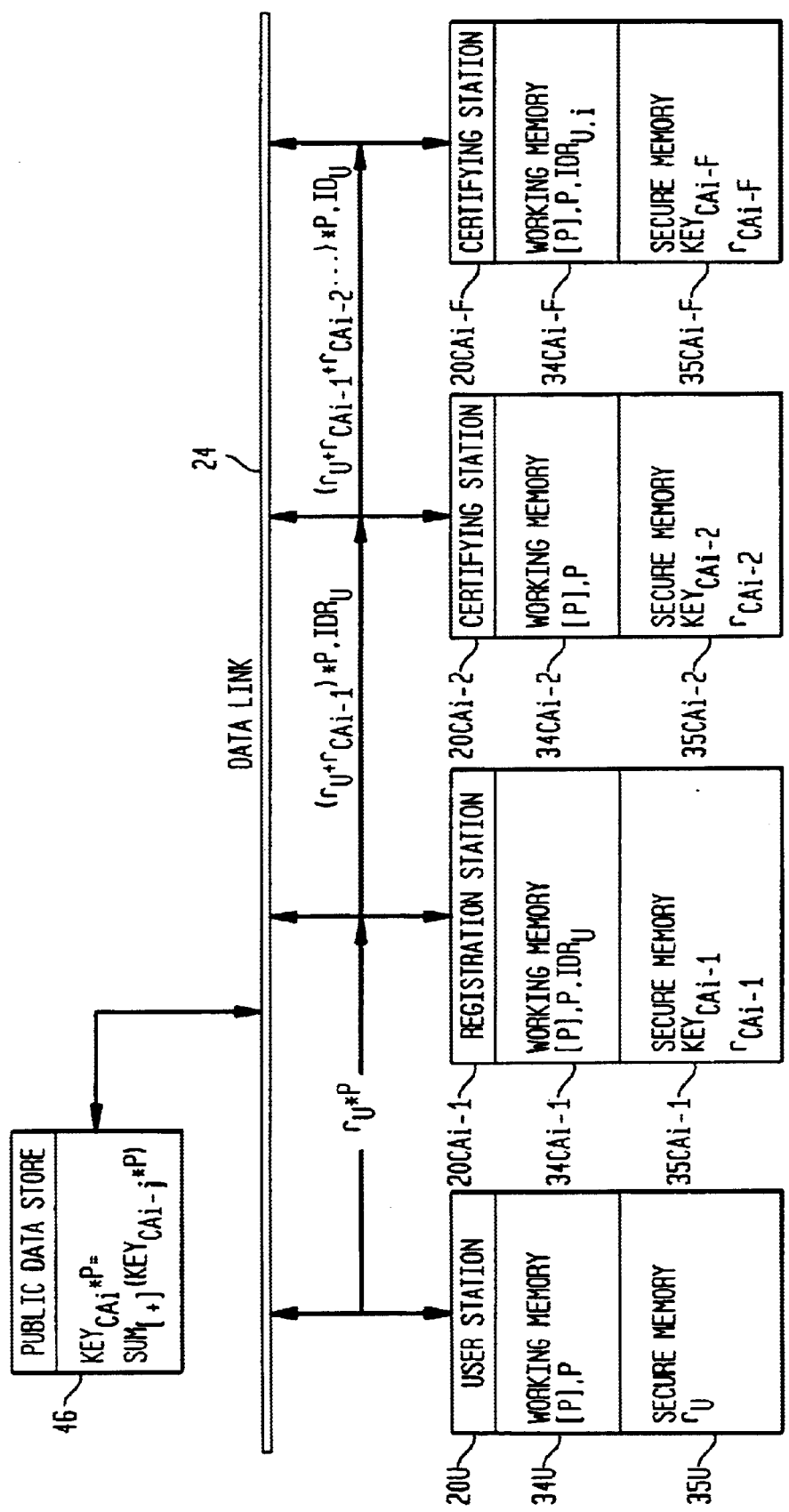
Figure 8:
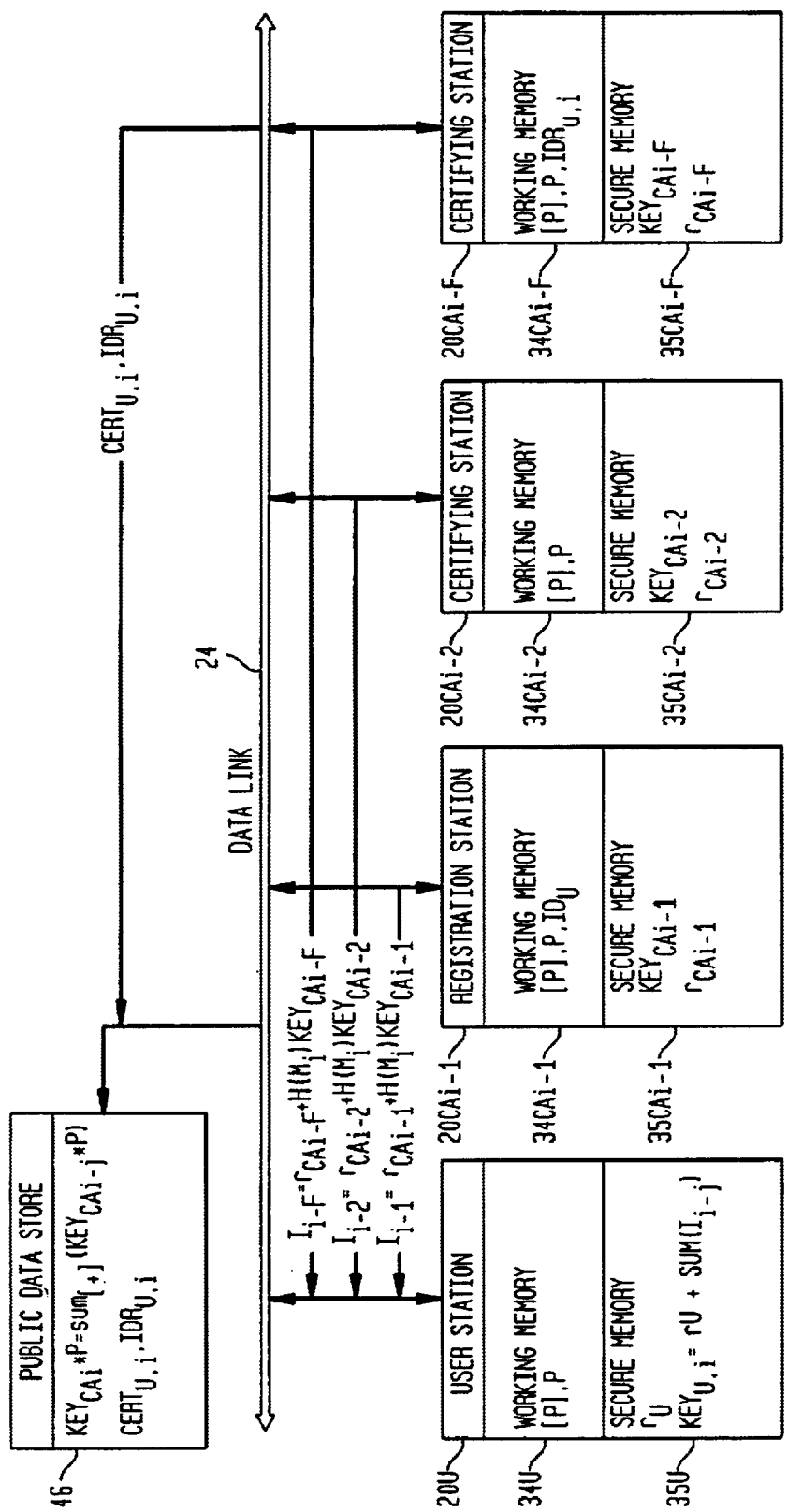

A particular right can require certification by a plurality of authorities. FIGS. 7 and 8 show certification of right $IDR_{U,i}$ by a plurality of certifying stations 20CAi-1–20CAi-F. Though only certification of rights $IDR_{U,i}$ is shown in FIGS. 7 and 8 for ease of illustration it will be understood that other rights are certified with right $IDR_{U,i}$ in the manner described in the present application.

In FIG. 7 user station 20U initiates the certification process by generating and storing a random number $r_U$ in secure memory 35U, computing the point $r_{U,i}*P$, and sending point $r_{U,i}*P$ to station 20CAi-1. Station 20CAi-1 is preferably operated by a registration authority who has responsibility for ascertaining the actual identity of user U. Station 20CAi-1 them generates and store a random number $r_{CAi-1}$ in secure memory 35CAi-1 and computes the point:

$$r_{U,i}*P[+]r_{CAi-1}*P = (r_U + r_{CAi-1})*P$$

and sends $(r_{U,i} + r_{CAi-1})*P$, $IDR_{U,i}$, where information $IDR_{U,i}$ identifies rights of user U, to station 20CAi-2 which similarly generates and stores a random number $r_{CAi-2}$ and computes a point $(r_{U,i} + r_{CAi-1} + r_{CAi-2})*P$. Assuming that all previous certifying stations will certify user U, final certifying station 20CAi-F will receive $(r_{U,i} + r_{CAi-1} + r_{CAi-2} + \ldots)*P$, $IDR_{U,i}$. In the case where a certifying station cannot certify user U the station can enter an error routine to abort the certification process. Details of such an error routine form no part of the subject invention. In other embodiments of the invention, successive certifying stations can alter or amend information $IDR_{U,i}$ to indicate user U's status.

Turning to FIG. 8 station 20CAi-F then generates and stores a random number $r_{CAi-F}$ in secure memory 35CAi-F and computes a point:

$$CERT_{U,i} = (r_{U,i} + r_{CAi-1} + r_{CAi-2} \ldots + r_{CAi-F})*P$$

and publishes message $M_i$:

$$M_i = CERT_{U,i}, IDR_{U,i}$$

by sending $M_i$ to public data store 46. Each certifying station 20CAi-1–20CAi-F then computes a hash $H(M_i)$ of message $M_i$ where H is a publicly known hashing function and is preferably the known SHA-1 function and then generates an integer $I_{i-j}$:

$$I_{i-j} = r_{CAi-j} + H(M_i) Key_{CAi-j}$$

for the jth one of said certifying stations, and sends integer $I_{i-j}$ to station 20U. Station 20U then sums over j to compute private key $Key_{U,i}$ corresponding to rights $IDR_{U,i}$:

$$Key_{U,i} = r_{U,i} + sum(I_{i-j}) = r_{U,i} + sum(r_{CAi-j}) + sum(H(M_i) Key_{CAi-j}).$$

(In computing integers $I_{i-j}$ the expression of point $CERT_{U,i}$ is handled as an integer.)

A party communicating with user U can then use public key $Key_{CAi}*P$ and message $M_i$ exactly as described above to determine if asserted rights $IDR_{U,i}$ have been certified to user U where, summing over j $$Key_{CAi}*P=\text{sum}[+](Key_{CAi\text{-}j}*P)$$

Since $Key_{CAi}*P$ and $CERT_{U,i}$ are simply points in [P] this will be transparent to any party communicating with user U. The party communicating with U is assured by verifying a signature that all authorities CAi-j certified the rights indicated by $M_i$.

A more detailed explanation of certification of a particular right by a plurality of certifying authorities is given in commonly assigned, co-pending U.S. patent application Ser. No. 09/280,527, filed on even date herewith; which is hereby incorporated by reference.

In other embodiments of the subject invention certification can be carried out, substantially as described above, over other sets [E] for which an operation [op] exists such that I[op]E, where I is an integer, is an element of [E] and computation of I from knowledge of [E], E, and I[op]E is hard. For example the Digital Signature Algorithm is based on a subgroup of integers modulo a prime number p with binary operation being exponentiation. However, elliptic curves are preferred as computationally more efficient.

The embodiments described above and illustrated in the attached drawings have been given by way of example and illustration only. From the teachings of the present application those skilled in the art will readily recognize numerous other embodiments in accordance with the subject invention. In particular they will recognize that particular sequences of exchange of data among the various stations are not critical so long as computation of private and public keys is carried out in accordance with the subject invention. Accordingly, limitations on the subject invention are to be found only in the claims set forth below.

What is claimed is:

1. A method for controlling, and distributing information among, a plurality of stations, one of said stations being a user station operated by a user U to generate a plurality of private encryption keys $Key_{U,i}$ and others of said stations being certifying stations operated by a plurality of certifying authorities for publishing related information, said related information identifying particular rights certified to said user U, so that a corresponding public key $Key_{U,sum(i)}*P$ of said user U can be determined by a party communicating with said user U from said published related information with assurance that at least rights asserted by said user U have been certified by corresponding ones of said certifying authorities CA, but said party cannot claim that other rights were asserted; said method comprising the steps of:

a) defining a finite group [P] with a binary operation [+] and publishing a particular point P in said group;
   b) defining and publishing a binary operation K*p, where K is an integer and p is a point in said group, such that K*p is a point in said group computed by applying said operation [+] to K copies of said point p, and computation of K from knowledge of the definition of said group [P], said point p, and K*p is hard;
   c) controlling each of said certifying stations to publish a certificate $CERT_{U,i}$ for said user U, wherein;

$$CERT_{U,i}=(r_{U,i}+r_{CAi})*P; \text{ and wherein}$$

$r_{U,i}$ is a random integer known only to said user U and $r_{CAi}$ is a random integer generated by an ith one of said certifying stations;

d) controlling each of said certifying stations to publish a message $M_i$ said message $M_i$ identifying particular rights certified to said user U by an ith one of said certifying stations;
   e) controlling each of said certifying stations to generate an integer $I_i$, and send $I_i$ to said user station, wherein;

$$I_i=r_{CAi}+H(M_i)Key_{CAi}; \text{ and wherein}$$

$H(M_i)$ is an integer derived from said message $M_i$ in accordance with a publicly known algorithm H, and $r_{CAi}$ is one of said random integers generated by, and $Key_{CAi}$ is a private key of, an ith one of said certifying stations;
   f) publishing a public key $Key_{CAi}*P$ for each of said certifying authorities CA; and
   g) controlling said user station to compute a plurality of private keys $Key_{U,i}$, wherein $$Key_{U,i}=r_{U,i}+I_i=r_{U,i}+r_{CAi}+H(M_i)Key_{CAi} \text{ whereby}$$

h) said user can generate a private key $Key_{U,sum(i)}$ to communicate while asserting only a selected subset of rights $$Key_{U,sum(i)}=\text{sum}(Key_{U,i})=\text{sum}(r_{U,i}+r_{CAi}+H(M_i)Key_{CAi}) \text{ summed over asserted rights; and}$$

i) said communicating party can compute said user's public key KeyU,sum(i)*P, summed over asserted rights, as $$Key_{U,sum(i)}*P=\text{sum}_{[+]}(CERT_{U,i}[+]H(M_i)Key_{CAi}*P)=\text{sum}_{[+]}((r_{U,i}+r_{CAi})*P[+]H(M_i)Key_{CAi}*P)=\text{sum}(r_{U,i}+r_{CAi}+H(M_i)Key_{CAi})*P$$

from knowledge of H, messages $M_i$, [P], said public keys $Key_{CAi}*P$, and certificates $CERT_{U,i}$.

2. A method as described in claim 1 wherein said publicly known manner for deriving an integer from said published information comprises applying a hashing function to said messages $M_i$.

3. A method as described in claim 2 wherein at least one of said messages $M_i$ includes information identifying or characterizing said user U.

4. A method as described in claim 1 wherein at least one of said messages $M_i$ includes information identifying or characterizing said user U.

5. A method as described in claim 1 wherein at least one of said particular rights is certified to said user U by a plurality of certifying authorities operating a corresponding plurality of certifying stations.

6. A method as described in claim 5 wherein one of said certifying stations is a registration station used by a registration authority said registration authority having responsibility for verifying said user's identity and incorporating information identifying or characterizing said user U into said message Mi.

7. A method as described in claim 1 wherein said group [P] is defined on an elliptic curve.

8. A method as described in claim 1 wherein said messages $M_i$ include information tying said user's public key $Key_{U,i}*P$ to information $IDR_{U,i}$ which identifies particular rights which can be certified by an ith one of said certifying authorities.

9. Data processing apparatus including a programmable processor programmed to control said apparatus as a user station used by a user U to generate a plurality of private encryption keys $Key_{U,i}$, said user station communicating with a plurality of certifying stations, each of said certifying stations being controlled to publish related information, said related information identifying particular rights certified to said user U, so that a corresponding public key $Key_{U,sum(i)}*P$ of said user U can be determined by a party communicating with said user U from said published related information with assurance that at least rights asserted by said user U have been certified by corresponding ones of said certifying authorities CA, but said party cannot claim that other rights were asserted, said related information including a certificates $CERT_{U,i}$ for said user U, wherein $CERT_{U,i}$ is $(r_{U,i}+r_{CAi})*P$, wherein P is a published point in a group [P], and wherein $r_{U,i}$ is a random integer known only to said user U and $r_{CAi}$ is a random integer generated by an ith one of said certifying stations; said processor controlling said apparatus to:

a) transmit a point $r_{U,i}*P$ in said group [P] to at least an ith one of said certifying stations to request particular rights certified by said ith certifying station;

b) receive at least one encrypted integer $I_i$ from said ith certifying station, wherein;

$I_i=r_{CAi}+H(M_i)Key_{CAi}$; and wherein $H(M_i)$ is an integer derived from a message $M_i$ in accordance with a publicly known algorithm H, and $r_{CAi}$ is a random integer generated by, and $Key_{CAi}$ is a private key of said ith certifying station;

c) generate at least one private key $Key_{U,i}$ as:

$Key_{U,i}=r_{U,i}+I_i=r_{U,i}+r_{CAi}+H(M_i)Key_{CAi}$; whereby d) said user can generate a private key $Key_{U,sum(i)}$ to communicate while asserting only a selected subset of rights $Key_{U,sum(i)}=sum(Key_{U,i})=sum(r_{U,i}+r_{CAi}+H(M_i)Key_{CAi})$ summed over asserted rights; and whereby e) said communicating party can compute said user's public key $Key_{U,sum(i)}*P$, summed over asserted rights, as $Key_{U,sum(i)}*P=sum_{[+]}(CERT_{U,i}[+]H(M_i)Key_{CAi}*P)=sum_{[+]}((r_{U,i}+r_{CAi})*P+H(M_i)Key_{CAi}*P)=sum(r_{U,i}+r_{U,i}+H(M_i)Key_{CAi})*P$ from knowledge of H, messages $M_i$, [P], said public keys $Key_{CAi}*P$, and certificates $CERT_{U,i}$.

\* \* \* \* \*